(12) United States Patent
Rotheut et al.

(10) Patent No.: US 9,993,892 B2
(45) Date of Patent: Jun. 12, 2018

(54) WELDING METHOD AND APPARATUS

(75) Inventors: Dietmar Rotheut, Eschweiler (DE); Guido H. Mueller, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 1018 days.

(21) Appl. No.: 13/350,214

(22) Filed: Jan. 13, 2012

(65) Prior Publication Data
US 2012/0181256 A1 Jul. 19, 2012

(30) Foreign Application Priority Data

Jan. 13, 2011 (DE) .................. 10 2011 002 620

(51) Int. Cl.
*B23K 11/00* (2006.01)
*B23K 11/11* (2006.01)

(52) U.S. Cl.
CPC ............ *B23K 11/002* (2013.01); *B23K 11/11* (2013.01)

(58) Field of Classification Search
CPC ... B23K 11/115; B23K 11/00; B23K 35/0205; B23K 11/315; B23K 11/002; B23K 11/11; H01R 43/0214; H01R 4/029; H01R 4/64; B23P 19/00
USPC ............... 219/78.01, 90, 117.1; 16/252, 253
See application file for complete search history.

(56) References Cited

U.S. PATENT DOCUMENTS

| | | | | |
|---|---|---|---|---|
| 1,351,909 A | * | 9/1920 | Johnson | 148/566 |
| 2,300,700 A | * | 11/1942 | Porter et al. | 219/86.9 |
| 2,441,438 A | * | 5/1948 | Mulder | 219/90 |
| 2,517,653 A | * | 8/1950 | Gaston | 219/90 |
| 2,636,971 A | * | 4/1953 | Delbrook | 219/233 |
| 2,747,063 A | * | 5/1956 | Waring | 219/90 |
| 2,749,417 A | * | 6/1956 | Griskell | 219/90 |
| 3,125,668 A | * | 3/1964 | Eisenburger | 219/87 |
| 3,337,711 A | * | 8/1967 | Garscia | 219/92 |
| 3,643,057 A | * | 2/1972 | Becker | 219/91.21 |
| 3,778,583 A | * | 12/1973 | Becker | 219/91.21 |
| 3,798,407 A | * | 3/1974 | Becker | 219/92 |

(Continued)

FOREIGN PATENT DOCUMENTS

| | | |
|---|---|---|
| JP | S57181782 A | 11/1982 |
| JP | 2004074259 A | 3/2004 |
| WO | 2009135938 A1 | 11/2009 |

OTHER PUBLICATIONS

State Intellectual Property Office of the People's Republic of China for Chinese Patent Application No. 201210004730.X dated Feb. 2, 2015.

*Primary Examiner* — Eric Stapleton
(74) *Attorney, Agent, or Firm* — Marla Johnston; Brooks Kushman P.C.

(57) ABSTRACT

A method and an apparatus for joining first and second sheet metal parts includes a support where the first and second parts are positioned with an edge of the second part surrounded by a beading flange of the first part. A joining electrode is positioned adjacent to the beading flange and a counter-electrode is positioned adjacent to the second part. An abutment of a tong-type welding apparatus in placed in contact with the support, and the joining electrode and the abutment are urged toward one another to press or clamp the beading flange between the joining electrode and the support. An electric current is applied to the beading flange using the joining electrode and the counter-electrode to weld the parts together.

8 Claims, 2 Drawing Sheets

(56) References Cited

U.S. PATENT DOCUMENTS

| | | | |
|---|---|---|---|
| 4,009,362 A * | 2/1977 | Becker | 219/92 |
| 4,037,073 A * | 7/1977 | Becker | 219/92 |
| RE29,762 E * | 9/1978 | Becker | 219/92 |
| 4,117,296 A * | 9/1978 | Becker | 219/91.21 |
| 4,125,753 A * | 11/1978 | Ritter et al. | 219/56 |
| 4,154,435 A * | 5/1979 | Alessio | 269/139 |
| 4,155,383 A * | 5/1979 | Welliver | 144/154.5 |
| 4,159,866 A * | 7/1979 | Wunsch et al. | 359/876 |
| 4,427,869 A * | 1/1984 | Kimura et al. | 219/93 |
| 4,468,550 A * | 8/1984 | Gott et al. | 219/56 |
| 4,498,662 A * | 2/1985 | Halter | 269/101 |
| 4,539,457 A * | 9/1985 | Pinger et al. | 219/58 |
| 4,555,099 A * | 11/1985 | Hilton | 269/88 |
| 4,733,704 A * | 3/1988 | Wolff | 144/286.1 |
| 4,845,333 A * | 7/1989 | Hidata | 219/117.1 |
| 5,130,511 A * | 7/1992 | Kumagai et al. | 219/117.1 |
| 5,186,228 A * | 2/1993 | Stafford | 144/286.1 |
| 5,225,647 A * | 7/1993 | Dufrenne | 219/86.51 |
| 5,272,306 A * | 12/1993 | Hirane | 219/110 |
| 5,321,225 A * | 6/1994 | Boyer | 219/89 |
| 5,581,138 A * | 12/1996 | Tukamoto et al. | 310/83 |
| 5,611,734 A * | 3/1997 | Beall | 470/59 |
| 5,714,730 A * | 2/1998 | Geiermann et al. | 219/86.25 |
| 5,739,499 A * | 4/1998 | Suzio et al. | 219/90 |
| 5,750,953 A * | 5/1998 | Sato et al. | 219/90 |
| 5,866,868 A * | 2/1999 | Hirane | 219/110 |
| 5,928,531 A * | 7/1999 | Sato et al. | 219/86.25 |
| 5,958,262 A * | 9/1999 | Palko et al. | 219/89 |
| 6,010,121 A * | 1/2000 | Lee | 269/94 |
| 6,029,965 A * | 2/2000 | Lee | 269/68 |
| 6,032,938 A * | 3/2000 | Jones | 269/64 |
| 6,148,881 A * | 11/2000 | Valenzuela | 144/286.1 |
| 8,178,817 B2 * | 5/2012 | Stieglbauer et al. | 219/119 |
| 2002/0017752 A1 * | 2/2002 | Levi | 269/139 |
| 2003/0041539 A1 * | 3/2003 | Bernacki et al. | 52/204.54 |
| 2003/0094441 A1 * | 5/2003 | Dugas et al. | 219/90 |
| 2003/0214088 A1 * | 11/2003 | Chang | 269/139 |
| 2004/0195213 A1 * | 10/2004 | Angel | 219/86.25 |
| 2005/0082729 A1 * | 4/2005 | Wong | 269/91 |
| 2005/0184439 A1 * | 8/2005 | Janson et al. | 269/6 |
| 2009/0050607 A1 * | 2/2009 | Kronegger et al. | 219/90 |

* cited by examiner

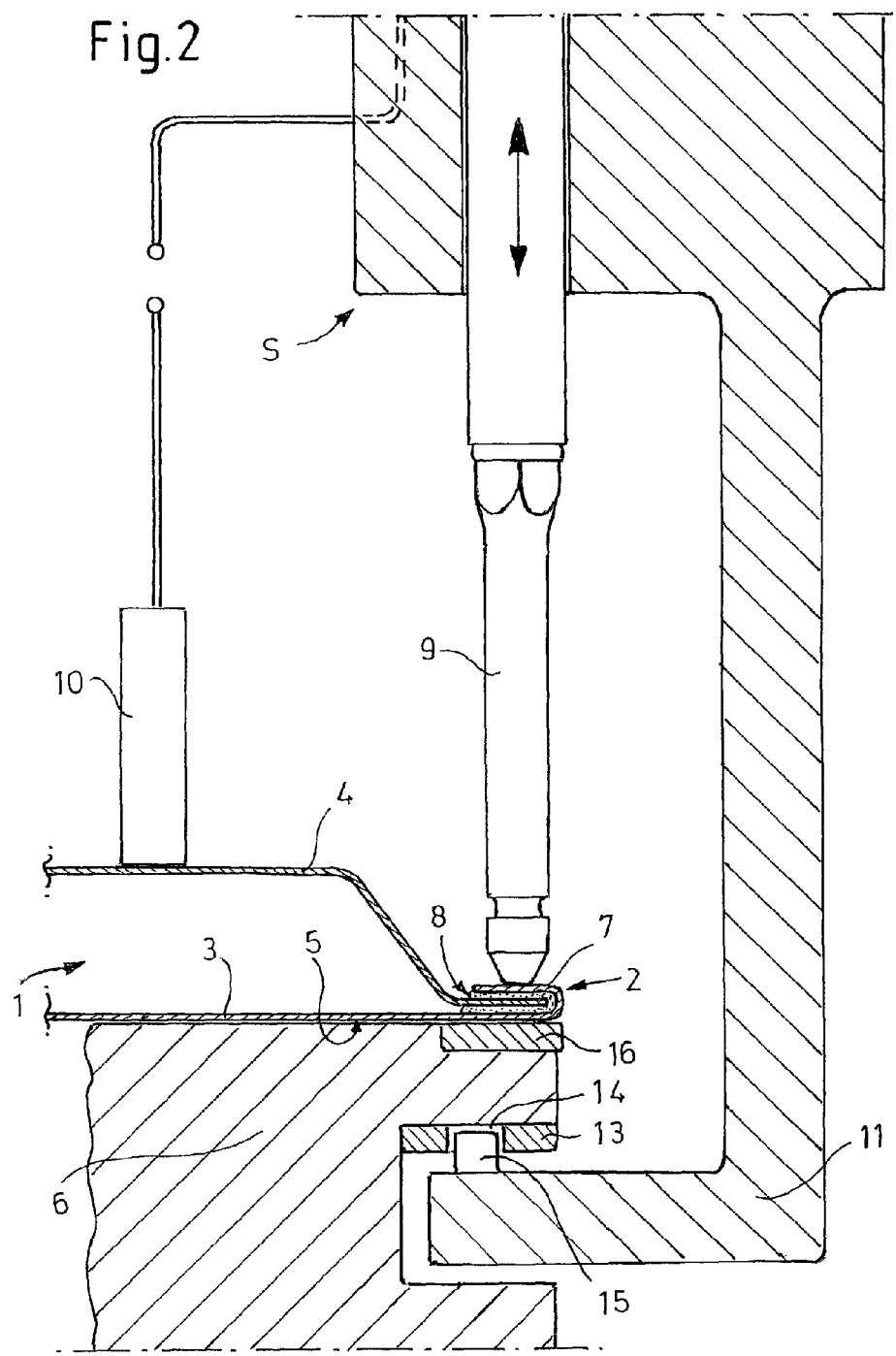

WELDING METHOD AND APPARATUS

CROSS-REFERENCE TO RELATED APPLICATIONS

This application claims foreign priority benefits under 35 U.S.C. § 119(a)-(d) to DE 10 2011 002 620.7, filed Jan. 13, 2011, which is hereby incorporated by reference in its entirety.

TECHNICAL FIELD

The invention relates to a method and apparatus for welding seamed or beaded flanges of sheet metal components by means of a tong-type welding apparatus.

BACKGROUND

The practice of producing vehicle components from two or more deep-drawn metal sheets that are connected by beading and adhesive bonding in the beading seam is known from the motor vehicle industry. While the adhesive is curing, the sheets may move relative to one another and, as a result, shape retention by the component is not assured. This is why two components that have already been connected by means of a positive-locking joint, preferably a seamed or beaded joint, are fixed relative to one another for the curing process. This is generally accomplished by means of resistance pressure welding.

External vehicle components, such as doors and hoods, are generally composed of a plurality of sheets which are connected in certain sections in the edge region by means of a seamed joint. The seamed joint is intended to avoid sharp edges in the edge region and the seamed joint, in combination with joining and sealing adhesive, ensures a rigid structure of the assembly.

To join such an assembly together, the usual practice is to apply a bead of adhesive to the edge region of a first part with a beading flange, which will subsequently form the outer skin. This can take place in the seaming bed or in an earlier work step. A second part, which forms an inner reinforcing structure, is then placed on or in the first part. The two parts are then partially or fully connected in a positive-locking manner in the edge region by seaming or beading. This may be accomplished by a process in which the beading flange is beaded around the edge of the inner part. During seaming, the adhesive is distributed fully over the contact surfaces of the parts and fills the flange cavities. This is intended to ensure a higher strength joint and corrosion protection.

The parts connected to one another or formed by beading are then generally welded to one another in the region of the beaded flange by means of welding tongs. Apart from providing a flow of current for the actual welding process, the welding tongs also apply a certain force required for good welding results and ensure that the parts are fixed relative to one another.

Since the assemblies mentioned are visible components which play an important role in determining the impression of quality made by the vehicle, the requirements on the geometrical tolerances and surface finish of the visible surface are extremely high.

However, a visible impression (e.g. welding mark) may be produced on both sides of the flange with conventional welding methods, and this is unwanted, especially on the outer or exterior-facing side of the component.

It is known to employ a tong-type welding apparatus, by means of which welding can be performed directly on a beaded edge or flange of a clamped component, for which purpose the joining electrode is placed directly on the flange or edge, usually on what is to be the interior-facing or inner side or the component. On the opposite side of the flange from the joining electrode, an abutment of the tong-type welding apparatus is urged against the flange. The counter-electrode is likewise placed on the inner side of the component, although not directly on but rather only in the vicinity of the flange.

Despite these modifications, however, there may still be unwanted impressions (e.g. distortions) on the resulting exterior-facing side of the component since the abutment of the tong-type welding apparatus clamps the component locally during welding and thus exerts a locally restricted pressure on the component and possibly also moves relative to the support. Combined with the high temperatures during welding, this frequently gives rise to distortions or deformations in the surface of the component on the abutment side.

SUMMARY

In an embodiment disclosed herein, a method for joining a first and a second metal part comprises positioning the first and second parts on a support such that an edge of the second part is surrounded by a beading flange of the first part, positioning a joining electrode adjacent to the beading flange, and placing a counter-electrode adjacent to the second part. An abutment of a tong-type welding apparatus is placed into contact with the support, and the joining electrode and the abutment are urged toward one another to press or clamp the beading flange between the joining electrode and the support. Electric current is then applied to the beading flange using the joining electrode and the counter-electrode.

In another embodiment, the tong-type welding apparatus performs tong compensation during the welding process in order to compensate for tolerances on the joining axis resulting, for example, from electrode wear or inaccuracy in the positioning of the welding robot (with which the method is preferably carried out).

In another embodiment, a thermally conductive insert is provided (opposite the joining electrode) in the support to dissipate the high temperatures which arise during welding.

In another embodiment, the step of placing the abutment in engagement with the support comprises inserting the abutment into a receptacle in the support.

In another embodiment, the insertion of the abutment into the receptacle brings complementary guide surfaces of the abutment and the receptacle into contact with one another to provide accurate positioning of the apparatus.

In another embodiment, the abutment interacts with a guide extending in a direction parallel to a clamping axis along which the joining electrode and the support are urged during the welding process, thus allowing the abutment to be positioned in a simple and reliable manner at locations where welding is to take place.

In another embodiment, the abutment is electrically insulated from the joining electrode and/or from the support in order to prevent a secondary welding current from flowing via the abutment to the counter-electrode.

In another embodiment, an apparatus for joining a first and a second metal part comprises a support having a seaming bed for positioning the first and second parts, a joining electrode movable with respect to the support to apply pressure to the first and second parts, a counter-electrode, and a tong-type welding apparatus having an abutment. The abutment engages the support and is movable with respect to the support to clamp the first and second parts between the joining electrode and the support as the welding current is supplied via the joining electrode and the counter-electrode.

The components that can be produced by means of the disclosed welding apparatus method include not only the body panels of a motor vehicle, such as doors, tailgates and engine hoods but also other components where there is a need to weld or at least tack a beading flange.

BRIEF DESCRIPTION OF THE DRAWINGS

Further details, features and advantages of the invention will emerge from the following description of an illustrative embodiment with reference to the drawing, in which:

FIG. 2 shows a schematic view of another embodiment of a welding apparatus.

DETAILED DESCRIPTION

Figure 1:
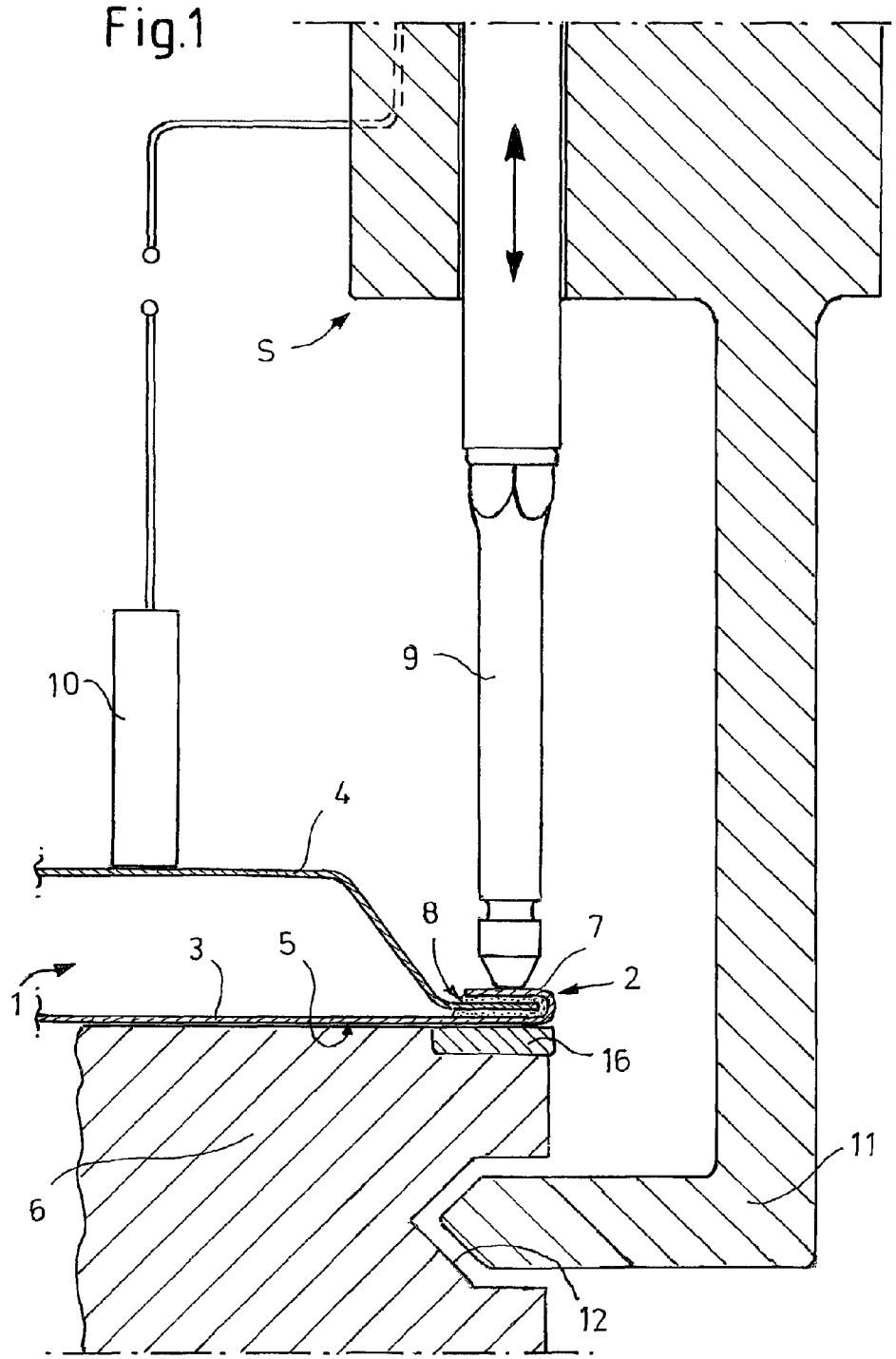
FIG. 1 shows a schematic view of an embodiment of a welding apparatus.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 shows a joining area 2 between two parts 3 and 4, which are to be welded to give a component 1 by means of a resistance pressure welding apparatus S in a first illustrative embodiment. The two parts 3 and 4 of the component 1 rest on a surface 5 of a support 6 that forms a seaming bed. To join the parts 3, 4 in a positive-locking manner, the first part 3, which will subsequently form the outer or exterior side of the resulting component, may be coated with adhesive 8 in the edge region, along a beading flange 7.

The second part 4, which forms an inner or interior structure of the component, is then placed on the first part 3 along the beading flange 7. The two parts are then fully or partially connected in a positive-locking manner in the edge region by seaming by a process in which the beading flange 7 is folded around the edge of the second part 4. During seaming, the adhesive 8 is distributed over the contact surfaces of the parts 3 and 4 and fills the cavities of the seaming pocket in order to obtain the strength of the joint and corrosion protection through sealing.

Welding then takes place at predetermined spaced locations (spots) along the beading flange 7 by means of the welding robot S. For this purpose, a joining electrode 9 is positioned adjacent to the beading flange 7, and a ground or counter-electrode 10 is positioned adjacent to the second part 4, at a certain distance from the beading flange 7, and they are then pressed on. The beading flange 7 is approached until the tool has reached a pre-programmed position relative to the beading flange 7. In this position, the counter-electrode 10 makes contact with the inner part 4 with a predefined force.

The joining electrode 9 is accordingly moved until it is in contact with the beading flange 7 and is pressed onto the beading flange 7 at a controlled clamping pressure. The welding apparatus can perform a "tong compensation" operation during this process.

In order to build up the clamping pressure on the beading flange 7 required for successful welding and to achieve accurate positioning, parts 3 and 4 rest on the support 6, in which an insulated abutment 11 in the form of a tong arm of the welding apparatus engages, said arm being embodied similarly to a known welding tong and countering the force exerted downwardly (as viewed in the present figures) by the joining electrode 9 during joining. It is to be understood that the vertical orientation of the clamping axis and the joining electrode 9 is by way of example only, as the welding process can take place along any clamping axis that is mechanically convenient for the particular component being welded.

For this purpose, the support has a receptacle 12 under the locations or beading points to be welded, into which the abutment 11 engages and which, in the process, may guide the abutment 11. The support 6, together with the component 1, is thus pressed against the joining electrode 9. An abutment over an extended area is thus provided. In order to affect guidance in the receptacle 12, the abutment 11 and the receptacle 12 are designed with complementary guide surfaces. The pointed/angled surfaces of abutment 11 and receptacle 12 shown in FIG. 1 are but one possible example of complementary guide surfaces.

In an alternative shown in FIG. 2, a guide plate 13 can be provided in the recess 12, the guide plate being provided with one or more holes 14 for engagement of corresponding guide pin(s) 15 of the abutment 11. The one or more holes 14 extend in a direction parallel to the clamping axis between the joining electrode 9 and support 6.

To dissipate the welding temperature, a thermally conductive insert 16 (composed of copper or a copper alloy, for example) can be provided in the support 6. In the case of resistance pressure welding, the insert can also be composed of plastic since less heat is generated during this process.

After positioning, the actual welding operation is carried out by applying electric current and pressure to the electrodes. The next welding position is then adopted and the operation is repeated.

By virtue of the fact that the abutment of the tong-type welding apparatus engages in a support which supports the component, and the support, together with the component, is pressed against the joining electrode, it is possible to provide a closed system of forces for the welding operation. Thus, all the parts which are relevant to welding (electrodes and the component) are maintained in a defined and fixed arrangement relative to one another. This makes possible a stiffness of the system and elastic expansion during welding (by way of tong compensation) and thus leads to optimum follow-up behavior. As a result, it is possible to achieve spatter-free and high-quality welds, and the components are therefore ready for painting with little or no finish-machining of the surface, this being particularly important for use in the motor vehicle sector.

At the same time, the component is held over an extended area in the support and is not subjected to local pressure. The support can be a separate welding support. On the other hand, it is also possible to use the beading bed as the support and thus to eliminate a separate station.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus for welding a component, comprising:
   a tong-type welding device having an electrode and an abutment movable in opposition to one another along an axis; and
   a support for the component positioned between the electrode and the abutment, and having a receptacle for receiving the abutment, the abutment engaging the receptacle and clamping the support and the component between the electrode and the abutment when the electrode and abutment are urged together.

2. The apparatus of claim 1 wherein the receptacle and abutment have complementary guide surfaces to guide the abutment into engagement with the receptacle.

3. The apparatus of claim 1 further comprising: a thermally conductive insert disposed on the support.

4. The apparatus of claim 3 wherein the thermally conductive insert is composed of at least one of copper, a copper alloy, and plastic.

5. The apparatus of claim 1 wherein the support has an axial guide disposed thereon to engage the abutment when the electrode and the abutment are urged together, the engagement guiding the support and the electrode into alignment in a plane normal to the axis.

6. The apparatus of claim 1 wherein the abutment is electrically insulated from at least one of the electrode and the support.

7. Apparatus comprising:
   an electrode and an abutment movable toward one another along an axis, the electrode and abutment electrically insulated from one another; and
   a support having a component-supporting portion disposed between the electrode and the abutment and having a receptacle for receiving the abutment such that the axis intersects the abutment and urging the electrode and abutment together along the axis clamps the portion and the component between the electrode and the abutment.

8. Apparatus for welding a component, comprising:
   a tong-type welding device having an electrode and an abutment movable toward one another along an axis; and
   a support for positioning the component and having a portion disposed between the electrode and the abutment, the support having a receptacle for receiving the abutment such that the portion of the support is between the electrode and the abutment, whereby urging the electrode and abutment toward one another clamps the portion of the support and the component between the electrode and the abutment, and the receptacle and the abutment having complementary guide features which engage one another when the electrode and the abutment are urged together to guide the support and the electrode into alignment in a plane normal to the axis.

* * * * *